US012398253B2

(12) United States Patent
Krause et al.

(10) Patent No.: US 12,398,253 B2
(45) Date of Patent: Aug. 26, 2025

(54) POLYMER FOAM PARTICLES AND PROCESS FOR PRODUCTION THEREOF BASED ON POLYBUTYLENE TEREPHTHALATE

(71) Applicant: ENVALIOR DEUTSCHLAND GMBH, Duesseldorf (DE)

(72) Inventors: Frank Krause, Bergisch-Gladbach (DE); Matthias Bienmueller, Krefeld (DE); Matthias Freitag, Cologne (DE)

(73) Assignee: ENVALIOR DEUTSCHLAND GMBH, Duesseldorf (DE)

( * ) Notice: Subject to any disclaimer, the term of this patent is extended or adjusted under 35 U.S.C. 154(b) by 536 days.

(21) Appl. No.: 17/730,268

(22) Filed: Apr. 27, 2022

(65) Prior Publication Data

US 2022/0348733 A1 Nov. 3, 2022

(30) Foreign Application Priority Data

Apr. 30, 2021 (EP) .................... 21171405

(51) Int. Cl.
| | |
|---|---|
| *C08J 9/12* | (2006.01) |
| *C08J 9/00* | (2006.01) |
| *C08J 9/18* | (2006.01) |
| *C08J 9/232* | (2006.01) |
| *C08L 67/02* | (2006.01) |

(52) U.S. Cl.
CPC ............ *C08J 9/122* (2013.01); *C08J 9/0038* (2013.01); *C08J 9/0061* (2013.01); *C08J 9/0066* (2013.01); *C08J 9/18* (2013.01); *C08J 9/232* (2013.01); *C08L 67/02* (2013.01); *C08J 2203/06* (2013.01); *C08J 2367/02* (2013.01); *C08J 2467/02* (2013.01); *C08L 2203/14* (2013.01); *C08L 2205/025* (2013.01)

(58) Field of Classification Search
CPC ........ C08J 9/122; C08J 9/0038; C08J 9/0061; C08J 9/0066; C08J 9/18; C08J 9/232; C08J 2203/06; C08J 2367/02; C08J 2467/02; C08J 2201/03; C08J 2201/034; C08J 9/16; C08J 9/0095; C08J 9/228; C08J 9/0033; C08L 67/02; C08L 2203/14; C08L 2205/025; B29B 9/06; B29B 9/065; B29B 9/12; B29B 9/16; B29C 44/3446; B29C 44/3461; B29C 44/38; B29C 44/445; B29C 44/58; B29C 44/60; B29C 48/0012; C08K 5/53
See application file for complete search history.

(56) References Cited

U.S. PATENT DOCUMENTS

| | | | |
|---|---|---|---|
| 5,852,084 A * | 12/1998 | Neri | ............ C07F 9/4841 524/126 |
| 8,144,265 B2 | 3/2012 | Ogino | |
| 8,554,582 B2 | 10/2013 | Ikeda | |
| 10,961,386 B2 | 3/2021 | Lin et al. | |
| 2005/0153134 A1* | 7/2005 | Sasaki | ............ B29B 9/06 264/143 |
| 2013/0059938 A1* | 3/2013 | Paetz-Lauter | ............ C08J 9/34 428/407 |
| 2014/0163156 A1* | 6/2014 | Bienmueller | ............ C08J 11/08 264/331.21 |
| 2017/0313874 A1 | 11/2017 | Sangermann et al. | |
| 2019/0202087 A1 | 7/2019 | Lohmann et al. | |
| 2020/0131360 A1 | 4/2020 | Lin et al. | |
| 2020/0190315 A1 | 6/2020 | Moritz et al. | |
| 2021/0221669 A1 | 7/2021 | But et al. | |

FOREIGN PATENT DOCUMENTS

| | | |
|---|---|---|
| CN | 109642041 | 4/2019 |
| CN | 109705542 A | 5/2019 |
| DE | 10 2018 007 301 A1 | 10/2019 |
| EP | 3 560 673 A1 | 10/2019 |
| JP | 50-39759 | 4/1975 |
| JP | 9-100398 | 4/1997 |
| JP | 2006-291063 | 10/2006 |
| JP | 2010-270238 | 12/2010 |
| JP | 2016-521796 | 7/2016 |
| JP | 2020-124874 | 8/2020 |

OTHER PUBLICATIONS

European Search Report from corresponding European U.S. Appl. No. 21/171,405, dated , Oct. 18, 2021 two pages.
Standau, Tobias et al., "Development of a Bead Foam from an Engineering Polymer with Addition of Chain Extender: Expanded Polybutylene Terephthalate", Ind. Eng. Chem. Res. 2018, 57, pp. 17170-17176, available from the Internet at www.pubs.acs.org.
Frenz, Volkder et al., "Multifunctional Polymers as Chain Extenders and Compatibilizers for Polycondensates and Biopolymers", ANTEC 2008, pp. 1682-1686.
Monella, Daniela et al., "Vergleichende Untersuchungen zur TeilchengroÈüenanalyse", Chemie Ingenieur Technik (72) WILEY-VCH Verlag GmbH, D-69469 Weinheim, 2000, pp. 273-276.
Kunststoff-Handbuch [Plastics Handbook], vol. VIII, Karl Hanser Verlag, Munich 1973), pp. 695-703.
Braun, Dipl. Ing. A., "Verfahrensentwicklung von physikalisch geschäumten Polypropylenplatten für den Einsatz als Kernmaterial von Sandwichverbunden" [Process Evolution of Physically Foamed Polypropylene Sheets for Use as Core Material of Sandwich Composites], Montanuniversitat Leoben, Jan. 2011, pp. 1-319.

(Continued)

*Primary Examiner* — K. Boyle
(74) *Attorney, Agent, or Firm* — Nixon & Vanderhye, P.C.

(57) ABSTRACT

The invention relates to polymer foam particles, both in expanded and partly expanded form, from a polymer matrix based on a blend comprising polybutylene terephthalate and polyethylene terephthalate, to a process for production thereof, and to the use of polyethylene terephthalate for broadening the processing window of polybutylene terephthalate-based polymer foam particles in processing to give mouldings.

20 Claims, No Drawings

(56) References Cited

OTHER PUBLICATIONS

Feurer, M et al., Development project supported under ref.: 32539/01 by the German Federal Environmental Foundation, A. Ungerer, "Die Entwicklung einer Variotherm-Technologie zur Halbierung des Energieverbrauchs in der EPP-Formteilherstellung" [The Development of a Variothermal Technology for Halving the Energy Consumption in EPP Moulding Production] from Apr. 2017, pp. 1-23.

Kunststoffe Dec. 2010, Carl Hanser Verlag, Munich, pp. 134-137.

Jun Li et al., Branching and Cross-linking of Poly(ethylene terephthalate) and its Foaming Properties, ISSN 1560-0904, *Polymer Science, Series B*, 2017, vol. 59, No. 2, pp. 164-172.

Search Report, CN Application No. 2022104671419, Apr. 29, 2022.

\* cited by examiner

POLYMER FOAM PARTICLES AND PROCESS FOR PRODUCTION THEREOF BASED ON POLYBUTYLENE TEREPHTHALATE

This application claims the benefit of priority of European Patent Application No. 21171405.0, filed on Apr. 30, 2021, the disclosure of which is hereby incorporated by reference.

The invention relates to polymer foam particles, both in expanded and partly expanded form, from a polymer matrix based on a blend comprising polybutylene terephthalate and polyethylene terephthalate, to a process for production thereof, and to the use of polyethylene terephthalate for broadening the processing window of polybutylene terephthalate-based polymer foam particles in processing to give mouldings.

BACKGROUND OF THE INVENTION

Thermoplastic-based polymer foam particles that are expandable or have been partly expanded by means of a blowing agent find use primarily for production of polymer mouldings. For this purpose, they are superficially welded to one another in a corresponding mould, especially under the action of hot steam, to form a moulding. If a proportion of the blowing agent is still present in the polymer foam particles, these are expanded/foamed in the mould, which can achieve a large-area weld bond of the polymer foam particles to one another, and by means of which a low-density moulding is obtainable.

Alternatively, expandable or partly expanded polymer foam particles can be heated under the action of electromagnetic radiation, especially in the microwave/radiofrequency range or the like, in order likewise to weld them to one another in a mould. If the polymers used in each case do not themselves have sufficient absorption capacity for the respective frequency range of the electromagnetic radiation, they can be coated/wetted with a medium that absorbs electromagnetic radiation, for example in the microwave and/or radiofrequency spectrum, especially water.

Polymer mouldings produced in this way, on account of the compressibility of the polymer foam formed from the expanded and mutually fused polymer foam particles, are notable for low density, and high heat, sound and impact absorption capacity. They are therefore used primarily for insulation materials, such as insulation panels for insulation of buildings or other insulation components, for example for roller shutter boxes, window profiles, for heating construction, for insulated vessels and the like, in automobile technology, for packaging materials, as core materials of sandwich-type mouldings, for example sports articles, surfboards, boat bodies etc., or for furniture building. Furthermore, fields of use for loose polymer foam particles, i.e. expanded polymer foam particles that have not been welded to one another to form a moulding, are, for example, as filler materials for packaging purposes, for beanbags and the like, as insulation materials for blow-in insulation, or else as imitation snow, for example for decorative purposes.

In practice, the production of expandable or partly expanded polymer foam particles from thermoplastic polymers is accomplished primarily within an extrusion operation, followed by a pelletizing operation on the polymer strand exiting from the die or a die assembly of an extruder. The thermoplastic base polymer is introduced in powder or pellet form into an extruder, and plastified and homogenized therein. Then a blowing agent—if one is not already present in the powder or pellets used—is introduced into the plastified material, preferably under pressure. On account of the pressure level in the extruder, which may be up to a few hundred bar, the blowing agent is in the liquid and/or supercritical phase even at the melting temperature of the plastified polymer, and is especially dissolved in the plastified material. Immediately after exiting from the extruder die, as a result of the abrupt drop in pressure, especially ambient pressure, there is expansion and foaming of the polymer strand on account of rapid expansion of the blowing agent into the gas phase. In the case of use of a die plate as extruder outlet, multiple polymer strands are obtained, in which the blowing agent expands simultaneously. The comminution or pelletization of the polymer strand(s) is typically accomplished by means of a cutting device downstream of the extruder. This is preferably a cutter that rotates coaxially to the extruder nozzle. While it is also known in the case of compact or unfoamed polymers to guide the polymer strand(s) through a water bath, followed by pelletization after sufficient cooling, expanded or foamed polymers are comminuted by means of the cutting device, for example in a water-filled chamber, in order to rapidly cool the polymer strand with added blowing agent and to "freeze" the fine-pore foam structure formed in the expansion of the blowing agent.

In order to ensure a very homogeneous, intimate weld bond of the expandable polymer foam particles, or those that have already at least partly expanded in the pelletizing operation, in a polymer moulding produced therefrom, it is generally desirable for the polymer foam particles to have a very substantially spherical but at least rounded outline. On production of the polymer foam particles themselves, this results in the requirement to comminute or pelletize the foaming polymer strand emerging from the extruder die very rapidly to give the polymer foam particles, since a spherical shape of the particles is achievable especially when the polymer strand is still in an at least semiplastic state. In addition, however, the polymer emerging from the extruder die should also be cooled or "quenched" very rapidly for an essentially homogeneous, fine-pore foam structure to form and for the bubbles formed from expanded blowing agent in the polymer matrix not to collapse.

It is also known that the expanding or foaming operation can be undertaken separately from the extruding operation, in that the polymer strand exiting from the extruder die, in very substantially unfoamed form, is first pelletized and then foamed—for example with hot steam in a foaming unit, initiated by a suitable blowing agent present in the polymer pellets.

While, on the one hand, primarily thermoplastic polymers originating from fossil raw materials are used in practice for the production of expandable or partly expanded polymer foam particles, there is research on the other hand into options for production of novel polymer foam particles and the associated challenges on processing and mould technology. Among the materials attracting increasing attention are engineering thermoplastics that can also be used as matrix material for fibre-polymer composites in applications at elevated temperatures. This enables combination of the excellent thermal and mechanical properties of engineering plastics with the low density of foams, and tailoring of the characteristics of material composites.

Extremely lightweight particle foam structures in the form of what are called sandwich concepts are likewise gaining increasing attention in research and development with regard to development of solutions to counter rising costs in the case of mineral oil-based fuels, to satisfaction of stricter legal provisions with regard to $CO_2$ emissions of motor vehicles or to implementation of thermal insulation. For example, in the field of electromobility, polymer foam is becoming ever more important as a thermally insulating core material. Future materials are likely to be multimaterial systems with foam cores made from thermoplastic foam particles.

However, polyester-based foams to date have a comparatively small range of application compared to polystyrene or polyurethane foams on account of processing-related challenges and typically high densities. Several hurdles have to be overcome for the successful implementation of a particle foam made from polybutylene terephthalate (PBT). Firstly, PBT has a low melt stability typical of polyesters, which is a barrier to high expansion during foaming. Secondly, the partial crystallinity results in a comparatively narrow processing window in the adjustment of the melting temperature during the foaming process.

However, polybutylene terephthalate [CAS No. 24968-12-5] is of excellent suitability for use in injection moulding at melt temperatures of 230 to 270° C., and has favourable cooling and processing characteristics (J. Falbe, M. Reglitz, RÖMPP Lexikon Chemie [RÖMPP's Chemical Lexicon], volume 5: Pl-S, 10th edition, Thieme, 1998). The melting point of PBT is reported as 223° C.; its glass transition temperature is 47° C.; the glass transition of the amorphous phase is at 60° C. Polybutylene terephthalate is valued especially owing to its high strength and stiffness, its very high dimensional stability compared to polyoxymethylene or polyamide, and its very good friction and wear properties.

The narrow melting range of the PBT crystals, which considerably restricts the processing window of PBT in particle foaming in particular, increases the demands on processing technology to a very particular degree. Experience has shown that the processing window of PBT is 225+/−2° C.

The melt stability of polyesters such as PBT, which is additionally low and therefore disadvantageous in foaming processes, was examined by T. Standau et. al., in Ind. Eng. Chem. Res. 2018, 57, 17170-17176. The main problems in the production of particle foams from PBT are considered therein to be (i) the necessity of improving the rheological properties (including the low melt stability),
(ii) fitting into the narrow processing window and
(iii) the fusion of the polymer foam particles.

Standau therefore uses the chain extender Joncryl® ADR 4468. This is a styrene-acrylate copolymer with epoxy functionality for improvement of melt viscosity; see also V. Frenz et. al., Multifunctional Polymers as Chain Extenders and Compatibilizers for Polycondensates and Biopolymers, ANTEC 2008, 1682-1686.

A disadvantage of the prior art solution is the introduction of styrene-acrylate polymer and hence a different type of polymer into the PBT. In spite of this advance, there is still a great need for expandable polyester pellets and polyester foams based on PBT that are notable not only for a low density but also for ease of processability and high degrees of freedom in shaping, especially since they are usable in a very resource-conserving manner, since the density of the foam and hence the raw material requirement and the foam properties can be established in the prefoaming operation. Foam particles can be foamed to give blocks or complex particle foam structures or mouldings in one step. If such particle foam structures are used in motor vehicle construction, however, these should be able to withstand the temperatures during an electrochemical painting method (cathodic electrocoating) in which the object to be painted is subjected to a bath of aqueous electrocoat under a DC voltage of 3000 volts and 220 to 290 amperes, and then the resultant coating is baked in a cathodic electrocoating drying oven at 200° C. for about 30 minutes.

It has now been found that, surprisingly, thermoplastic expandable or partly expanded polymer foam particles based on a polymer matrix made from polybutylene terephthalate (PBT) can be produced by modifying the PBT with polyethylene terephthalate, which considerably broadens the processing window of the PBT in a foaming process without significantly adversely affecting the other properties of the PBT.

SUBJECT-MATTER OF THE INVENTION

The present invention provides polymer foam particles comprising at least one blowing agent selected from the group of air, nitrogen and carbon dioxide, especially carbon dioxide, and 25 to 320 parts by mass of polyethylene terephthalate per 100 parts by mass of polybutylene terephthalate.

The invention also provides a process for producing polymer foam particles, wherein powders or pellets of a polymer matrix (a) are introduced into an extruder with exclusion of crosslinking agents and/or chain-extending agents and plastified and homogenized,
(b) a blowing agent selected from the group of air, nitrogen and carbon dioxide, especially carbon dioxide, is dispersed into the plastified polymer matrix in an extruder,
(c) the plastified polymer matrix with the added blowing agent is discharged from the extruder through an extruder die,
(d) the extruded polymer matrix strand with the added blowing agent is pelletized downstream of the extruder die to form expandable or at least partly expanded polymer foam particles, and
(e) the polymer foam particles are expanded, preferably thermally expanded, especially in a continuous infrared oven, wherein the polymer matrix contains 25 to 320 parts by mass of polyethylene terephthalate per 100 parts by mass of polybutylene terephthalate.

Preference is given to carrying out process steps (c) and (d) in or with a cooling fluid. The cooling fluid to be used in steps (c) and (d), in a further embodiment, may be under elevated pressure. Elevated pressure in the context of the present invention is preferably a pressure in the range from 1.5 to 30 bar.

By contrast with the prior art, in accordance with the invention, PET and PBT, in an ideal manner as thermoplastics of the same kind, are processed together with controlled establishment of the optimal processing window for foaming, it being possible to dispense with the additional use of a polymer of a different kind.

The experiments in the context of the invention additionally show that, surprisingly, the use of PET in PBT reduces the growth rate of foam cells that arise at nucleation points. As a result, with use of PET to be used in accordance with the invention, foam cells form at more nucleation points. This in turn leads, surprisingly, to PBT-based polymer foam particles with a more uniform cell structure composed of small foam cells. This is because nucleation, i.e. the formation of a cell nucleus, commences in the PBT polymer melts that are oversaturated with blowing gases. This oversaturation is typically achieved either by decompression of a solution of a polymer and a physical blowing agent in the equilibrium state, or by heating of a polymer melt with added decomposing chemical blowing agent. Mixed-in solid particles usually act as nucleation points in polymer melts. Once a foam cell has reached a critical size, the tendency of the blowing gas to diffuse in the foam cell causes it to grow until it is stabilized or bursts. The thin, significantly expanded cell walls in thermoplastic melts are intrinsically unstable unless they are stabilized. Foam cells may typically be either physically or chemically stabilized. If physical blowing agents are used and expansion is achieved by means of decompression, foam cells are physically stabilized. Foam cells are stabilized here on account of an abrupt rise in the modulus of elasticity as a result of the biaxial extension of the foam cell walls. This effect is also referred to as strain-hardening. The rate of foam cell expansion also influences the strain-hardening effect. The phase separation of the blowing gas in the foam cell wall stabilization additionally plays a crucial role. The formation of the gas phase brings about a cooling effect through removal of heat from the polymer melt. The cooling effect increases the extensional viscosity of the melt. The suitability of a polyester type for physical stabilization is equivalent to suitability for achieving closed-cell structures and is referred to as "foamability of the polymer".

In order to trigger the foaming of a blowing fluid-laden melt at the mould exit, the sorption capacity of the polymer to be foamed must be reduced. According to Henry's law, this can in principle be achieved in two ways: by an increase in temperature or a reduction in pressure. Since plastics are generally poor heat conductors and an increase in temperature would also lower the melt viscosity, oversaturation of the melt with blowing fluid is achieved in practice by a reduction in pressure. However, the experiments in the context of the present invention show that, surprisingly, the use of PET in PBT increases the melt viscosity of the PBT. The invention therefore also relates to the use of PET for increasing the melt viscosity of PBT from 109 to 112 Pa·s up to >200 Pa·s (Pa·scal×second), preferably of PBT for production of particle foams. The melt viscosity of PBT is increased especially preferably when talc is used in addition to the PET.

The invention also provides a method of broadening the processing window of PBT as matrix polymer in in-mould foaming by extending the melting range of PBT-based expandable or at least partly expanded polymer foam particles from 225+/−2° C. to a range from 223 to 255° C., using 25 to 320 parts by mass of polyethylene terephthalate per 100 parts by mass of polybutylene terephthalate.

The invention also preferably provides a method of broadening the processing window of PBT as matrix polymer in in-mould foaming by extending the melting range of PBT-based expandable or at least partly expanded polymer foam particles from 225+/−2° C. to a range from 223 to 255° C., using 25 to 320 parts by mass of polyethylene terephthalate per 100 parts by mass of polybutylene terephthalate and 0.1 to 20 parts by mass, preferably 0.1 to 5 parts by mass, of talc.

The invention also relates to the use of polyethylene terephthalate for broadening the processing window of polybutylene terephthalate in the form of matrix polymer-containing expandable or at least partly expanded polymer foam particles in in-mould foaming of polybutylene terephthalate from 225° C.+/−2° C. to the range from 223 to 255° C. and/or for increasing the melt viscosity of polybutylene terephthalate to be used as matrix polymer for expandable or at least partly expanded polymer foam particles in in-mould foaming, in that 25 to 320 parts by mass of polyethylene terephthalate are used per 100 parts by mass of polybutylene terephthalate.

The invention preferably also relates to the use of polyethylene terephthalate for broadening the processing window of polybutylene terephthalate in the form of matrix polymer-containing expandable or at least partly expanded polymer foam particles in in-mould foaming of polybutylene terephthalate from 225° C.+/−2° C. to the range from 223 to 255° C. and/or for increasing the melt viscosity of polybutylene terephthalate to be used as matrix polymer for expandable or at least partly expanded polymer foam particles in in-mould foaming, in that 25 to 320 parts by mass of polyethylene terephthalate and 0.1 to 20 parts by mass, preferably 0.1 to 5 parts by mass, of talc are used per 100 parts by mass of polybutylene terephthalate.

The PBT-based polymer foam particles according to the invention are expandable or at least partly expanded polymer foam particles for production of particle foams or sandwich structures based thereon.

For the sake of clarity, it should be noted that the scope of the present invention encompasses all the definitions and parameters cited in general or in preferred ranges in any desired combinations. This applies to the polymer foam particles, to the production process therefor, and to the uses described in the context of the present invention. The standards cited in the context of this application relate to the current edition on the filing date of the present invention.

FURTHER PREFERRED EMBODIMENTS OF THE INVENTION

The present invention preferably provides polymer foam particles having a density in the range from 50 to 700 kg/m$^3$, comprising at least one blowing agent selected from the group of air, nitrogen and carbon dioxide, especially carbon dioxide, and 25 to 320 parts by mass of polyethylene terephthalate per 100 parts by mass of polybutylene terephthalate.

The present invention more preferably provides polymer foam particles having a density in the range from 90 to 400 kg/m$^3$, comprising at least one blowing agent selected from the group of air, nitrogen and carbon dioxide, especially carbon dioxide, and 25 to 320 parts by mass of polyethylene terephthalate per 100 parts by mass of polybutylene terephthalate.

The present invention even more preferably provides polymer foam particles having a density in the range from 50 to 700 kg/m$^3$, comprising at least one blowing agent selected from the group of air, nitrogen and carbon dioxide, especially carbon dioxide, and 25 to 320 parts by mass of polyethylene terephthalate and 0.1 to 20 parts by mass, preferably 0.1 to 5 parts by mass, of talc per 100 parts by mass of polybutylene terephthalate.

The present invention even more especially preferably provides polymer foam particles having a density in the range from 90 to 400 kg/m$^3$, comprising at least one blowing agent selected from the group of air, nitrogen and carbon dioxide, especially carbon dioxide, and 25 to 320 parts by mass of polyethylene terephthalate and 0.1 to 20 parts by mass, preferably 0.1 to 5 parts by mass, of talc per 100 parts by mass of polybutylene terephthalate.

In a preferred embodiment, the present invention relates to a process for producing polymer foam particles, preferably having a density in the range from 50 to 700 kg/m$^3$, more preferably having a density in the range from 90 to 400 kg/m$^3$, wherein powders or pellets of a polymer matrix (a) are introduced into an extruder with exclusion of crosslinking agents and/or chain-extending agents and plastified and homogenized, (b) a gaseous blowing agent selected from the group of air, nitrogen and carbon dioxide is dispersed into the plastified polymer matrix in an extruder, (c) the plastified polymer matrix with the added blowing agent is discharged from the extruder through an extruder die, (d) the extruded polymer matrix strand with the added blowing agent is pelletized downstream of the extruder die to form expandable or at least partly expanded polymer foam particles, and (e) the polymer foam particles are expanded, preferably thermally expanded, especially in a continuous infrared oven, wherein the polymer matrix contains 25 to 320 parts by mass of polyethylene terephthalate and 0.1 to 20 parts by mass, preferably 0.1 to 5 parts by mass, of talc per 100 parts by mass of polybutylene terephthalate. Preference is given to carrying out steps (c) and (d) in or with a cooling fluid.

In an alternative or preferred embodiment, prior to process step (e), the pelletized polymer foam particles are contacted with blowing agent in an autoclave under suitable pressure over a suitable period of time. The appropriate conditions can be ascertained by a person skilled in the art by appropriate experimentation.

Preferably, in the process according to the invention, prior to process step (e), the blowing agent used is carbon dioxide. The PBT/PET-based polymer foam particles according to the invention therefore contain solely carbon dioxide as blowing agent in a preferred embodiment. According to the invention, therefore, the PET to be used is used in combination with carbon dioxide as blowing agent, preferably in further combination with talc.

In a further preferred embodiment, in the polymer foam particles, but also in the process according to the invention and in the use of the PET according to the invention, 0.1 to 20 parts by mass, more preferably 0.1 to 5 parts by mass, of at least one additive other than talc per 100 parts by mass of PBT is used in addition to talc.

Preferred additives other than talc are selected from the group of UV stabilizers, thermal stabilizers, lubricants and demoulding agents, fillers and reinforcers, nucleating agents other than talc, laser absorbers, di- or polyfunctional branching or chain-extending additives, hydrolysis stabilizers, antistats, emulsifiers, plasticizers, processing auxiliaries, flow auxiliaries, elastomer modifiers and colourants. These additives may be used alone or in admixture/in the form of masterbatches.

Lubricants and mould release agents other than talc that are preferred as additive are selected from the group of the long-chain fatty acids, the salts of long-chain fatty acids, the ester derivatives of long-chain fatty acids, and also montan waxes. Preferred long-chain fatty acids are stearic acid or behenic acid. Preferred salts of the long-chain fatty acids are calcium or zinc stearate. Preferred ester derivatives of long-chain fatty acids are those based on pentaerythritol, more particularly $C_{16}$-$C_{18}$ fatty acid esters of pentaerythritol [CAS No. 68604-44-4] or [CAS No. 85116-93-4]. Montan waxes in the context of the present invention are mixtures of straight-chain saturated carboxylic acids having chain lengths of from 28 to 32 carbon atoms. Particular preference is given in accordance with the invention to using lubricants and/or mould release agents from the group of esters of saturated or unsaturated aliphatic carboxylic acids comprising 8 to 40 carbon atoms with aliphatic saturated alcohols comprising 2 to 40 carbon atoms and metal salts of saturated or unsaturated aliphatic carboxylic acids comprising 8 to 40 carbon atoms, with particular preference for pentaerythritol tetrastearate [CAS No. 115-83-3], calcium stearate [CAS No. 1592-23-0] and/or ethylene glycol dimontanate, in particular Licowax® E [CAS No. 74388-22-0] from Clariant, Muttenz, Basel, and very especially particular preference for pentaerythritol tetrastearate, for example obtainable as Loxiol® P861 from Emery Oleochemicals GmbH, Düsseldorf, Germany.

Colourants other than talc that are preferred as additive are organic pigments, preferably phthalocyanines, quinacridones, perylenes and dyes, preferably nigrosin or anthraquinones, and also inorganic pigments, especially titanium dioxide and/or barium sulfate, ultramarine blue, iron oxide, zinc sulfide or carbon black.

Plasticizers other than talc that are preferred as additive are dioctyl phthalate, dibenzyl phthalate, butyl benzyl phthalate, hydrocarbon oils or N-(n-butyl)benzenesulfonamide.

Nucleating agents other than talc to be used with preference as additive are sodium or potassium salts of acetate, salicylate, stearate, saccharinate, and partly hydrolysed montan waxes and ionomers.

Heat stabilizers other than talc that are preferred as additive are selected from the group of sterically hindered phenols and aliphatically or aromatically substituted phosphites, and variously substituted representatives of these groups. Among the sterically hindered phenols, preference is given to those having at least one 3-tert-butyl-4-hydroxy-5-methylphenyl unit and/or at least one 3,5-di(tert-butyl-4-hydroxyphenyl) unit, particular preference being given to hexane-1,6-diol bis[3-(3,5-di-tert-butyl-4-hydroxyphenyl)propionate] [CAS No. 35074-77-2] (Irganox® 259 from BASF SE, Ludwigshafen, Germany), pentaerythritol tetrakis[3-(3,5-di-tert-butyl-4-hydroxyphenyl)propionate] [CAS No. 6683-19-8] (Irganox® 1010 from BASF SE) and 3,9-bis[2-[3-(3-tert-butyl-4-hydroxy-5-methylphenyl)propionyloxy]-1,1-dimethylethyl]-2,4,8,10-tetraoxaspiro[5.5]undecane [CAS No. 90498-90-1] (ADK Stab® AO 80). ADK Stab® AO 80 is commercially available from Adeka-Palmerole SAS, Mulhouse, France.

Among the aliphatically or aromatically substituted phosphonites, preference is given to using tetrakis(2,4-di-tert-butylphenyl)-4,4-biphenyldiphosphonite [CAS No. 119345-01-6], available for example from Clariant International Ltd, Muttenz, Switzerland, under the Hostanox® P-EPQ name, bis(2,4-dicumylphenyl)pentaerythritoldiphosphite [CAS No. 154862-43-8], available for example from Dover Chemical Corp., Dover, USA, under the Doverphos® S9228 trade name, and/or tetrakis(2,4-di-tert-butylphenyl)-1,1-biphenyl-4,4'-diylbisphosphonite [CAS No. 38613-77-3].

Elastomer modifiers other than talc that are preferred as additive are one or more graft polymers of at least one vinyl monomer D.1 and one or more graft substrates D.2, having glass transition temperatures <10° C., preferably <0° C., more preferably <−20° C., with use of preferably 5% to 95% by weight, more preferably amounts of 30% to 90% by weight, of D.1 and 95% to 5% by weight, more preferably 70% to 10% by weight, of D.2, where the percentages by weight relate to 100 per cent by weight of elastomer modifier. Preferred embodiments of elastomer modifiers to be used in accordance with the invention are detailed in EP 3 239 228 A1, the contents of which are fully encompassed by the present invention.

Fillers or reinforcers other than talc that are to be used with preference as additive are at least one from the group of mica, silicate, quartz, ground quartz, titanium dioxide, amorphous silicas, barium sulfate, glass beads, ground glass and/or fibrous fillers and reinforcers based on glass fibres or carbon fibres.

Particular preference is given to using glass beads or ground glass, very particular preference to using glass beads, as filler or reinforcer. When glass beads are used, figures for particle size distribution or particle sizes relate to what are called surface area-based particle sizes, each prior to incorporation into the thermoplastic moulding compound. The diameters of the areas of the respective glass particles are expressed here in relation to the surface areas of imaginary spherical particles (spheres). This is accomplished with a particle size analyser that works by the principle of laser dimming from Ankersmid (Eye Tech® including the Eye-Tech® software and ACM-104 measurement cell, Ankersmid Lab, Oosterhout, the Netherlands).

The fillers and/or reinforcers other than talc that are to be used as additive may, as a result of the processing to give the moulding compound or to give a particle foam structure according to the invention, have a smaller d97 or d50 value therein than the fillers or reinforcers originally used. With regard to the d50 and d97 values in this application, the determination thereof and the meaning thereof, reference is made to Chemie Ingenieur Technik (72) p. 273-276, March 2000, Wiley-VCH Verlags GmbH, Weinheim, 2000, according to which the d50 value is that particle size below which 50% of the amount of particles lie (median value) and the d97 value is that particle size below which 97% of the amount of particles lie.

The fillers and reinforcers other than talc that are to be used as additive may be used individually or as a mixture of two or more different fillers and/or reinforcers. In a preferred embodiment, the filler and/or reinforcer for use as additive may have been surface-modified, more preferably with an adhesion promoter/adhesion promoter system, especially preferably an epoxide- or silane-based adhesion promoter/adhesion promoter system. However, pretreatment is not absolutely necessary. Preferred embodiments of adhesion promoters to be used in accordance with the invention are likewise given in EP 3 239 228 A1.

Particular preference is given to using, in addition to talc as additive, tetrakis(2,4-di-tert-butylphenyl) 4,4-biphenyldiphosphonite (Hostanox® P-EPQ).

The present invention preferably provides a process for producing polymer foam particles, preferably having a density in the range from 50 to 700 kg/m³, wherein powders or pellets of a polymer matrix (a) are introduced into an extruder with exclusion of crosslinking agents and/or chain-extending agents and plastified and homogenized, (b) a blowing agent selected from the group of air, nitrogen and carbon dioxide is dispersed into the plastified polymer matrix in an extruder, (c) the plastified polymer matrix with the added blowing agent is discharged from the extruder through an extruder die, (d) the extruded polymer matrix strand with the added blowing agent is pelletized downstream of the extruder die to form expandable or at least partly expanded polymer foam particles, and (e) the polymer foam particles are expanded, preferably thermally expanded, especially in a continuous infrared oven, wherein the polymer matrix contains 25 to 320 parts by mass of polyethylene terephthalate, 0.1 to 20 parts by mass, preferably 0.1 to 5 parts by mass, of talc and 0.1 to 20 parts by mass, preferably 0.1 to 5 parts by mass, of tetrakis(2,4-di-tert-butylphenyl) 4,4-biphenyldiphosphonite per 100 parts by mass of polybutylene terephthalate. Preference is given to carrying out steps (c) and (d) in or with a cooling fluid.

The invention preferably also provides a method of broadening the processing window of PBT as matrix polymer in the production of thermoplastic, expandable or at least partly expanded polymer foam particles, by extending the melting range of pure PBT from 225+/−2° C. to the range from 223 to 255° C., wherein 25 to 320 parts by mass of polyethylene terephthalate, 0.1 to 20 parts by mass, preferably 0.1 to 5 parts by mass, of talc and 0.1 to 20 parts by mass, preferably 0.1 to 5 parts by mass, of tetrakis(2,4-di-tert-butylphenyl) 4,4-biphenyldiphosphonite are used per 100 parts by mass of polybutylene terephthalate.

Finally, the present invention preferably relates to the use of polyethylene terephthalate for broadening the processing window of polybutylene terephthalate in the form of matrix polymer-containing expandable or at least partly expanded polymer foam particles in in-mould foaming of polybutylene terephthalate from 225° C.+/−2° C. to the range from 223 to 255° C. and/or for increasing the melt viscosity of polybutylene terephthalate to be used as matrix polymer for expandable or at least partly expanded polymer foam particles in in-mould foaming, in that 25 to 320 parts by mass of polyethylene terephthalate and 0.1 to 20 parts by mass, preferably 0.1 to 5 parts by mass, of talc and 0.1 to 20 parts by mass, preferably 0.1 to 5 parts by mass, of tetrakis(2,4-di-tert-butylphenyl) 4,4-biphenyldiphosphonite are used per 100 parts by mass of polybutylene terephthalate.

Polybutylene Terephthalate (PBT)

The polybutylene terephthalate (PBT) to be used in accordance with the invention is prepared from terephthalic acid or the reactive derivatives thereof and butanediol by known methods (Kunststoff-Handbuch [Plastics Handbook], vol. VIII, p. 695 ff., Karl Hanser Verlag, Munich 1973). The PBT to be used preferably contains at least 80 mol %, preferably at least 90 mol %, of terephthalic acid radicals based on the dicarboxylic acid.

In one embodiment, the PBT to be used in accordance with the invention as base polymer may contain not only terephthalic acid radicals but also up to 20 mol % of radicals of other aromatic dicarboxylic acids having 8 to 14 carbon atoms or radicals of aliphatic dicarboxylic acids having 4 to 12 carbon atoms, especially radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid, cyclohexanedicarboxylic acid or furan-2,5-dicarboxylic acid.

In one embodiment, the PBT to be used in accordance with the invention as base polymer may contain not only butanediol but also up to 20 mol % of other aliphatic diols having 3 to 12 carbon atoms or up to 20 mol % of cycloaliphatic diols having 6 to 21 carbon atoms, preferably radicals of propane-1,3-diol, 2-ethylpropane-1,3-diol, neopentyl glycol, pentane-1,5-diol, hexane-1,6-diol, 1,4-cyclohexanedimethanol, 3-methylpentane-2,4-diol, 2-methylpentane-2,4-diol, 2,2,4-trimethylpentane-1,3-diol, 2,2,4-trimethylpentane-1,5-diol, 2-ethylhexane-1,3-diol, 2,2-diethylpropane-1,3-diol, hexane-2,5-diol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane.

PBT to be used with preference as base polymer has an intrinsic viscosity to be determined to EN-ISO 1628/5 in the range from 30 to 150 cm³/g, more preferably in the range from 40 to 130 cm$^3$/g, most preferably in the range from 50 to 100 cm$^3$/g, in each case measured in an Ubbelohde viscometer in phenol/o-dichlorobenzene (1:1 part by weight) at 25° C. Intrinsic viscosity iV, also referred to as Staudinger Index or limiting viscosity, is proportional, according to the Mark-Houwink equation, to the average molecular mass, and is the extrapolation of the viscosity number VN for the case of vanishing polymer concentrations. It can be estimated from series of measurements or through the use of suitable approximation methods (e.g. Billmeyer). VN [ml/g] is obtained from the measurement of the solution viscosity in a capillary viscometer, for example an Ubbelohde viscometer. Solution viscosity is a measure of the average molecular weight of a plastic. The determination is effected on dissolved polymer using various solvents, preferably formic acid, m-cresol, tetrachloroethane, phenol, 1,2-dichlorobenzene, etc., and concentrations. The viscosity number VN makes it possible to monitor the processing and performance characteristics of plastics. A thermal load on the polymer, ageing processes or exposure to chemicals, weathering and light can be investigated by means of comparative measurements. In this regard, see also: de.wikipedia.org/wiki/Viskosimetrie and de.wikipedia.org/wiki/Mark-Houwink-Gleichung.

PBT preferred for use in accordance with the invention as base polymer is available from Lanxess Deutschland GmbH, Cologne under the name Pocan® B 1300.

Polyethylene Terephthalate (PET)

Polyethylene terephthalate [CAS No. 25038-59-9] is a thermoplastic prepared by polycondensation from the family of the polyesters. PET has various fields of use, and its uses include production of plastic bottles, films and textile fibres. Its density is 1.38 g/cm$^3$; its melting point is 260° C. PET is virtually water-soluble and has a glass transition temperature of 70° C. For further technical data see: de.wikipedia.org/wiki/Polyethylenterephthalat.

PET for use with preference in accordance with the invention has an intrinsic viscosity according to EN-ISO 1628/5 in the range from 30 to 150 cm$^3$/g, more preferably in the range from 40 to 130 cm$^3$/g, most preferably in the range from 50 to 100 cm$^3$/g, in each case measured in phenol/o-dichlorobenzene (1:1 parts by weight) at 25° C. in an Ubbelohde viscometer. Intrinsic viscosity iV, also referred to as Staudinger Index or limiting viscosity, is proportional, according to the Mark-Houwink equation, to the average molecular mass, and is the extrapolation of the viscosity number VN for the case of vanishing polymer concentrations. It can be estimated from series of measurements or through the use of suitable approximation methods (e.g. Billmeyer). VN [ml/g] is obtained from the measurement of the solution viscosity in a capillary viscometer, for example an Ubbelohde viscometer. Solution viscosity is a measure of the average molecular weight of a plastic. The determination is effected on dissolved polymer, with various solvents (formic acid, m-cresol, tetrachloroethane, phenol, 1,2-dichlorobenzene, etc.) and concentrations being used. The viscosity number VN makes it possible to monitor the processing and performance characteristics of plastics. A thermal load on the polymer, ageing processes or exposure to chemicals, weathering and light can be investigated by means of comparative measurements. In this connection see also: de.wikipedia.org/wiki/Viskosimetrie and de.wikipedia.org/wiki/Mark-Houwink-Gleichung.

PET for use in accordance with the invention may be sourced as Lighter C88 from Equipolymers s.r.l., Amsterdam, the Netherlands.

Process for Production of Polymer Foam Particles

It is found to be advantageous that the process according to the invention can be conducted with exclusion of any crosslinking agents and/or chain extenders such as Joncryl® ADR 4468, including those based on epoxides, such that not only is the use of such substances that are harmful to the environment and health made dispensable, but the PBT-based polymer foam particles thus produced especially also have a polymer matrix formed from polyalkylene terephthalates of the same kind.

The prefoaming may preferably be effected in an autoclave process or by means of extrusion of a gas-laden melt.

In an alternative or else preferred embodiment, prior to process step (e), the pellets of expanded polymer foam particles are contacted with blowing agent in an autoclave under a pressure of 5 to 60 bar over a period of 2 to 60 h.

The PBT is preferably used in the form of a PET-blended masterbatch from step (a) in the extruder, and plastified and homogenized collectively with exclusion of crosslinking agents and/or chain extenders, with addition of at least one blowing agent in process step (b) and with dispersion into the plastified polymer matrix of the PBT with the PET used as blend partner in the extruder. Then the polymer matrix composed of the blend with added blowing agent from process step (c) is discharged from the extruder through at least one extruder die, and then the extruded polymer strand with the at least one blowing agent added is pelletized in process step (d) downstream of the extruder die to form the polymer foam particles. Preference is given to carrying out process steps (c) and (d) in or with a cooling fluid. In a preferred embodiment, the cooling fluid used is under an elevated pressure relative to ambient pressure.

In process step (e), the pellets, optionally with added blowing agent, are expanded, preferably thermally expanded, especially expanded in a continuous infrared oven.

The at least one blowing agent, especially carbon dioxide, may appropriately be added in a proportion of about 1% by mass to about 20% by mass, especially of about 2% by mass to about 15% by mass, preferably of about 3% by mass to about 10% by mass, based on the mass of the polymer matrix.

Preferably in accordance with the invention, talc is added to the PBT-based and PET-blended polymer matrix. Talc (magnesium silicate hydrate), as a fine particulate nucleating agent, ensures good bubble formation in the expansion or foaming and also high crystallinity of the PET-blended PBT polymer matrix, and also high heat distortion resistance in a later application. Particular preference is given to using talc [CAS No.14807-96-6] in the form of microcrystalline talc. Talc is a sheet silicate having the chemical composition $Mg_3[Si_4O_{10}(OH)_2]$, which, depending on the modification, crystallizes as talc-1A in the triclinic crystal system or as talc-2M in the monoclinic crystal system (de.wikipedia.org/wiki/Talkum). The talc to be used is commercially available, for example, under the name Mistron® R10 from Imerys Talc Group, Toulouse, France (Rio Tinto Group).

While the cooling fluid used with preference in process steps (c) and (d) of the process according to the invention may in principle also be a gas or gas mixture, it may be the case in an advantageous configuration that the cooling fluid used is a liquid, especially an aqueous medium, for example water, which, on account of a comparatively high heat capacity, is capable of ensuring a high cooling rate of the expandable polymer foam particles produced in process step (d).

According to the desired bulk density of the expandable polymer foam particles based on polybutylene terephthalate that are produced in process step (d), it may be the case that the cooling fluid is kept under a pressure of
- at least about 1.5 bar, especially at least about 2 bar, preferably of at least about 5 bar; and/or
- at most about 30 bar, especially at most about 25 bar, preferably of at most about 20 bar.

A comparatively high pressure of the cooling fluid of at least about 5 bar is capable of counteracting expansion or foaming of the polymer foam particles on pelletization thereof in process step (d). Because the cooling fluid cools down the blowing agent-containing polymer foam particles relatively quickly below their glass transition temperature based on the blend of PBT/PET, degassing is prevented and highly blowing agent-laden expandable polymer foam particles are produced. These have a relatively high bulk density and can be foamed solely by a mere thermal treatment to give expanded polymer foam particles having very low bulk densities and consequently very high pore volume. If the pressure of the cooling fluid, by contrast, is adjusted to a value of up to about 5 bar, the pelletizing in process step (d) may already induce at least partial expansion or foaming of the polymer foam particles, so as to result in lower bulk densities of the partly foamed but nevertheless still further-expandable polymer foam particles obtained against a higher pressure of the cooling fluid. The latter may preferably be an option when the at least partly foamed polymer foam particles are not to be stored intermediately or transported onward over a prolonged period of time but processed directly or promptly.

For the purposes mentioned, the cooling fluid may preferably be kept at a temperature of
- at least about 0° C., especially at least about 5° C., preferably at least about 10° C.; and/or
- at most about 90° C., especially at most about 70° C., preferably at most about 50° C.

The contacting of the pellets prior to process step (e) with at least one blowing agent for production of expanded PBT-based polymer foam particles, which is employed in an alternative or preferred embodiment of this invention, is effected in an autoclave under pressure. Preference is given here to employing pressures in the range from 5 to 60 bar. Preference is given to contacting over a period of 2 to 60 h, which depends on the concentration of the blowing agent in the pellets and the temperature in the autoclave that are desired in each case according to the batch. Preference is given to employing at least one blowing agent from the group of air, nitrogen and carbon dioxide, more preferably carbon dioxide.

Once the pellets have absorbed sufficient blowing agent, especially carbon dioxide, they are removed from the autoclave and expanded, preferably thermally expanded, in process step (e). Especially preferably, the expansion is effected in a continuous infrared oven. During the expansion, the pellets that have been contacted with blowing agent, by absorbing radiation over a short period of time, take on the temperature at which the blowing agent, especially carbon dioxide, causes the softened PBT and PET-modified polymer matrix to rise like a yeast dough. What takes a few minutes in the prior art, especially when steam is used, and often requires subsequent conditioning proceeds in an entirely dry manner within a few seconds in accordance with the invention. The speed of progression through the expansion process, especially in the continuous infrared oven, and the energy to be introduced, especially the infrared source power in the continuous infrared oven, must be adjusted in accordance with the PET-blended PBT pellets and the use amount thereof. During the expansion operation, especially during the passage through the continuous infrared oven, the PBT pellets that have been blended with PET in accordance with the invention are heated to close to their softening temperature, which allows the blowing agent incorporated to expand locally at nucleation points and to locally form cells that together produce a foam structure. The cell growth is determined by the pressure differential between the interior of a cell and the medium surrounding the cell, by the diffusion of the blowing gas into existing cells, by the cooling effect resulting from the phase transformation of the blowing agent, and by the viscoelastic properties of the PET-blended or -modified PBT depending on the melt temperature.

The cell growth process is described in principle in the thesis by Dipl. Ing. A. Braun "Verfahrensentwicklung von physikalisch geschäumten Polypropylenplatten für den Einsatz als Kernmaterial von Sandwichverbunden" [Process Evolution of Physically Foamed Polypropylene Sheets for Use as Core Material of Sandwich Composites], Montanuniversität Leoben, January 2011 in chapter 2.5.6. Accordingly, cell growth in a polymeric foam is determined crucially by the exchange of gas between melt and cell, and by the viscoelastic properties of the polymer. While gas exchange is attributable to the above-addressed sorption and diffusion processes, viscoelastic properties are influenced mainly by the choice of polymer and the temperature control in the process. The polymer melt is subjected to biaxial extensional stress in the cell walls. When the melt strength of the polymer melt is too low, the cell walls can break open, hence resulting in combination of adjacent cells.

What is advantageous in accordance with the invention for cell growth and hence uniform foaming is a relatively high melt viscosity of the PBT achieved in the low shear viscosity range by virtue of the PET used. The higher melt viscosity of the PBT achieved by means of PET reduces the coalescence of individual cells to form larger cells. As a result, the individual cells remain relatively small and the structure of a foam bead is homogeneous.

The degree of foaming depends on the amount of blowing agent/gas incorporated in the foam beads, and on the time taken to pass through the expansion process in process step (e), especially on the time taken to pass through the continuous infrared oven and the source output thereof. After passing through the expansion operation, especially after passing through the continuous infrared oven, the pellets may be processed further as polymer foam particles in the in-mould foaming process in the present case.

It is thus possible to set the desired bulk density of the polymer foam particles to the desired value in a simple manner within relatively broad intervals of preferably greater than 400 g/l to less than 100 g/l, by varying the duration of heat treatment and/or the proportion of blowing agent to be used in accordance with the invention. The heat treatment for prefoaming of the polymer foam particles based on PBT can be effected in virtually any desired manner. The heat treatment for prefoaming is preferably effected by means of correspondingly temperature-controlled water vapour, air, water or other heat transfer fluids, by exposure of the polymer foam particles to electromagnetic radiation, preferably in the infrared region by means of a heat source, or with microwave or radiofrequency radiation or the like.

It is of course possible here in principle, at the above-described stage of prefoaming of the expandable polymer foam particles based on PBT that are obtained in process step (d)—whether they are still essentially compact or whether they have already been at least partly expanded or foamed, according to the cooling fluid pressure set—at elevated temperature to establish an elevated pressure relative to ambient pressure or else reduced pressure. However, the polymer foam particles obtained in process step (d), for the reasons given, can be prefoamed in a simple and inexpensive manner, especially essentially at ambient pressure, in order to achieve the above-described very low bulk densities or very high pore volumes.

In the context of the present invention, preference is given to contacting PBT-based pellets containing PET and talc and optionally at least one additive other than talc, especially Hostanox® P-EPQ, having a diameter in the range from 0.1 to 5 mm and a length in the range from 0.1 to 10 mm, with blowing agent, especially $CO_2$, in an autoclave at a pressure in the range from 5 to 100 bar over a period in the range from 1 to 250 h. The pellets to be used preferably have a diameter in the diameter range from 0.5 to 2 mm. The pellets to be used preferably have a length in the range from 0.5 to 3 mm. The autoclave is preferably operated at a pressure in the range from 10 to 70 bar. Contacting with $CO_2$ is preferably effected over a period in the range from 5 to 50 h.

Subsequently, it has been found to be useful to guide the pellets that have been contacted in accordance with the invention with blowing agent, especially $CO_2$, through a continuous infrared oven (single-lane SL continuous infrared oven from Fox Velution GmbH) with a source power in the region of 90% (here: about 20 kW) at a temperature measured at the continuous infrared oven exit in the range from 220 to 255° C. (in the context of the present invention, reference band temperatures were measured optically because temperatures of 50° C. to 950° C. exist at different positions in the oven itself) with a progression speed in the range from 300 to 1400 mm/s, preferably with a progression speed in the range from 500 to 800 mm/s. Finally, the particles are stabilized at room temperature for 24 hours.

While the expandable and/or at least partly expanded polymer foam particles based on PET-blended PBT produced by means of the process of the invention, as already described, can have variable bulk densities within wide limits, it may be the case in an advantageous configuration that they
- have a proportion of PBT in the polymer matrix of at least 49% by mass, especially of at least 60% by mass, preferably of at least 75% by mass,
- in the compacted state from process step (d) (i.e. before any prefoaming) have a bulk density of at least 800 g/l,—after foaming at a temperature in the range from 220° C. to 260° C. over a period of 100 s at ambient pressure have a bulk density of at most about 700 g/l, preferably of at most 400 g/l, more preferably of at most 200 g/l, especially of at most 50 g/l.

Process for Production of Particle Foam Mouldings

The production of particle foam mouldings from polymer foam particles in moulding machines is known to the person skilled in the art and, according to Kunststoffe December 2010, Carl Hanser Verlag, Munich, pages 134-137, comprises basically the following five stages:
- closing the mould;
- filling the mould cavity with simultaneous compression of the polymer foam particles using compressed air;
- softening, expanding and sintering the polymer foam particles using steam;
- cooling and stabilizing by means of cooling water, optionally by vacuum assistance;
- demoulding and optionally, for reasons of trueness to scale, drying in temperature-controlled ovens.

Kunststoffe 12/2010 on page 135 describes a moulding machine for production of particle foam mouldings in FIG. 2, and shows a schematic of the particle foam process in FIG. 3. The polymer foam particles are sucked from a reservoir silo into a pressure filling system and compressed. The precompressed polymer foam particles are filled into a mould cavity through injectors by means of compressed air. The compression of the polymer foam particles influences the later moulding density. Typically, there are nozzles in the mould cavity that have diameters in the region of tenths of millimetres, the function of which is to assure devolatilization during the filling and introduction of the process steam. The process steam used here softens the polymer foam particles to such an extent that sintering to give the moulding can take place. A cooling system in the mould accelerates the stabilization of the particle foam moulding and hence ensures relatively rapid demouldability after a total cycle time of about 60 to 180 s according to the component geometry.

Until a few years ago, this steam-based processing of particle foam raw material such as EPP (expanded polypropylene) and EPS (expanded polystyrene) on moulding machines with process steam pressures of up to 5 bar and hence maximum temperatures of up to max. 160° C., as described in Kunststoffe December 2010, pages 134-137, was state of the art. The required processing temperature is controlled here via the vapour pressure. The processing of engineering thermoplastics having a comparatively high melting or glass transition temperature, for instance E-PBT and E-PET, generally also requires higher processing temperatures that cannot be established with standard processing equipment.

Cathodic electrocoating, which is customary nowadays in chassis manufacture, with high baking temperatures in the range from 200 to 230° C., for thermoplastic-containing motor vehicle components, requires a much higher thermal stability of the thermoplastic to be used. For such an application according to D. Schulz, VDWF im Dialog April 2016, pages 3-7 a corresponding particle foam based on expanded polybutylene terephthalate (E-PBT) is suitable. Components made of E-PBT have a higher thermal use limit by around 100° C., compared to EPP of the same density. Heat distortion resistance studies show that the specimens produced from this material are still absolutely dimensionally stable and shape-stable even at 200° C. with exposure for more than 30 minutes. On account of the higher thermal stability, the processing of E-PBT also requires higher steam pressures of more than 10 bar. This in turn places higher demands on tools, machines and safety technology.

Particle foams based on PBT have higher densities than those based on EPP and EPS. This has to date considerably restricted their lightweight construction potential. This challenge can now be avoided firstly through the use of PET for broadening the processing window, and by loading the generally already prefoamed PBT-based polymer foam particles under elevated pressure with gas, preferably nitrogen, carbon dioxide or air, especially carbon dioxide, and foaming them further in subsequent steps in order to reduce their density.

Process plants newly developed for the production of particle foams, also referred to as pressure and temperature plants (PAT plants), allow the control both of the loading pressure and of the temperature in the pressure tank. Since the diffusion rate in polymers rises significantly above the glass transition temperature thereof, it is thus possible to achieve rapid pressure loading even of engineering plastics such as PBT. With modern PAT plants, it is possible to load particle foams with gas at pressures in the range from 0 to 14 bar and temperatures up to 200° C. In addition, the starting pellets may simultaneously also be automatically coated with liquid, viscous or pulverulent functional materials, for example for electrical conductivity or for colour effects. By means of optimized pressure loading parameters, it was possible, for example, to reduce the bulk density of expanded thermoplastics to such an extent and hence to produce mouldings that are even 44% lighter than components foamed in a conventional manner. PAT plants for use in accordance with the invention are available from Teubert Maschinenbau GmbH, Blumberg, Germany as Teubert EPP Unimat or Teubert TVZ.

But the speed with which the polymer foam particles can be "filled" with air, nitrogen or carbon dioxide depends considerably on the temperature conditions that exist. To date, industrially established pressure loading systems have worked solely at room temperature. More recent plants permit control both of the loading pressure and of the temperature in the pressure tank. Since the diffusion rate in thermoplastics rises significantly above the glass transition temperature thereof, it is thus possible to achieve rapid pressure loading even of engineering plastics such as PBT.

By virtue of the combination of additive mould manufacturing and completely steam-free processing, modern methods in combination with PET- and preferably additionally talc-modified PBT are opening up completely new perspectives with regard to functionalization and lightweight construction. For instance, it is possible to manufacture mouldings with local reinforcements and from gradient and mixed materials in situ, i.e. in a process-integrated, straight-from-the-mould and reprocessing-free manner. Surfaces can be configured virtually as desired by virtue of textiles, films and structural elements, up to and including paper, introduced into the mould. In-mould coating of metal or plastic elements, even in unencased form, and of electronic or optical components is likewise readily possible.

Further application potential arises, for process-related reasons, in closed structures. Sandwich structures provided with impermeable outer layers on multiple sides can now be manufactured "in-process" in a steam-free manner with PET- and preferably additionally talc-modified PBT. This innovative approach to particle foam processing offers numerous options and new applications, especially in lightweight construction through locally functionalized material use.

The subsequently stabilized polymer foam particles obtainable in accordance with the invention from the expansion process, especially from the continuous infrared oven, can then be processed further directly, or else only after storage, in a further step to give products or shaped bodies. For the in-mould foaming, a variothermally temperature-controllable mould is used in accordance with the invention.

The invention also relates to products or shaped bodies based on the above-described polymer foam particles, or those obtainable by the above process, by supplying them to a variothermally temperature-controllable mould. The invention therefore also relates to products or shaped bodies that are obtainable by prefoaming of polymer foam particles by the above process with energy input and supply thereof to a variothermally temperature-controllable mould for the purpose of moulding.

The specimens obtained by steam-free foam moulding on the pilot scale are formed with the aid of highly thermally dynamic moulds (heating and cooling rates of up to 30 K/second). In the range from room temperature (23+/−2° C.) up to about 190° C.—with more than 250° C. being technically possible—cycle times of less than one minute are achieved depending on the target wall thickness. In principle, sandwich structures, as particular embodiments of particle foam mouldings according to the invention, always consist of two high-strength and stiff outer layers bonded to a rigid core material of minimum weight by an adhesive boundary layer. The outer layers absorb tensile forces on the top side and compressive forces on the bottom side that arise under stress, while the core is responsible for the transmission of shear forces. As a result of the increase in the separation of the two outer layers from one another, stiffness and strength are multiplied, while the weight of a sandwich structure according to the invention rises only slightly on account of the low density of the core material.

In the steam-free particle foam processing according to the invention by means of highly dynamic variothermal mould technology, highly dynamic variothermal mould cavities are used. By virtue of high-precision heating and cooling of the mould cavities, it is possible to heat the polymer foam particles by means of radiative heat from the mould cavity wall and conduction of heat in such a way that they melt at the surface and hence are welded, but do not melt into the core. Depending on the temperature control unit used and the temperature control medium, processing temperatures well above 160° C. are even possible, and in fact even temperatures for processing of PET-blended PBT to be used in accordance with the invention of well above 200° C. are achievable in accordance with the invention.

Steam-free particle foam processing by means of highly dynamic variothermal mould technology additionally permits the processing of hydrolysis-sensitive materials/components as required for electronic components/sensors, or the production of particle foam cores that are to be completely encased by films or fibre composite outer layers.

By virtue of the inventive use of PBT in combination with PET and additionally preferably in the presence of talc, it is now possible to open up fields of use that have hitherto been closed to conventional particle foams. On account of the ever more compact design of engines and the associated evolution of heat, according to the invention, PET-modified E-PBT (E for expanded) is a suitable candidate for engine space insulation. It is now likewise possible to introduce E-PBT that has been PET-modified in accordance with the invention, even at a very early stage of production, into chassis elements that then pass through the painting process in a composite, especially in cathodic electrocoating baths and drying tunnels with relatively high temperatures (30 minutes at up to about 200° C.).

Processes and moulds to be used for steam-free particle foam processing by means of highly dynamic variothermal mould technology for production of large-volume or thick-wall particle foam components are described in DE 10 2018 007 301 A1, in EP 3 560 674 A1 and in EP 3 560 673 A1. A measure used here for binding of the particle foam material or of the particle foam particles is steam-free exposure of the particle foam material or of the particle foam material particles to thermal energy (heat). The thermal energy may lead to bonding/fusion/sintering of at least sections of the particle foam material or of the particle foam material particles. In principle, both conductive and convective modes of energy introduction and energy transfer are useful. The thermal energy can be introduced into the particle foam material or the particle foam material particles, for example, via energy transfer from at least one temperature-controllable or temperature-controlled mould wall section of a mould. In order to achieve uniform melting of the particle foam material in the in-mould foaming process, the heat from the variothermally temperature-controllable mould must penetrate into the middle of the polymer foam moulding.

The invention preferably also relates to the use of polyethylene terephthalate for broadening the processing window of polybutylene terephthalate as matrix polymer in the production of polymer foam particles by extending the melting range of polybutylene terephthalate from 225° C.+/−2° C. to the range from 223 to 255° C., wherein 25 to 320 parts by mass of polyethylene terephthalate, 0.1 to 20 parts by mass of talc and 0.01 to 20 parts by mass of tetrakis(2,4-di-tert-butylphenyl) 4,4-biphenyldiphosphonite (Hostanox® P-EPQ) are used per 100 parts by mass of polybutylene terephthalate.

The use according to the invention preferably relates to the broadening of the processing window in steam-free particle foam processing to give particle foam products or mouldings by means of highly dynamic variothermal mould technology. More preferably, this use according to the invention is effected in a variothermal mould with a flash face for pressurization.

"Variothermal" is composed of "vario" (Latin: be different, vary, fluctuate) and "thermal" (warm). The term "variothermal" is used relatively frequently in injection moulding in the sense of a "method that controls the temperature of moulds in a concerted manner over the course of the cycle". The principle of highly dynamic variothermal mould technology is a variothermal method of mould temperature control in which the mould cavity is preadjusted to such a temperature that the polymer remains molten after injection, which achieves a precise image of the surface fineness in the mould and a streak-free surface. By virtue of an optimized temperature control system with near-contour cavity surface temperature control, the variothermal process requires only insignificantly longer cooling times than the conventional steam operated process. Further advantages are the absence of visible weld lines in the end product, and a considerable reduction in component warpage. This technology is already being used in injection moulding processes. Advantages are a higher quality of the component surfaces, very good contour trueness, and the possibility of moulding of very small micro- and nanostructures. In this regard see: Development project supported under ref.: 32539/01 by the German Federal Environmental Foundation, M. Feurer, A. Ungerer, "Die Entwicklung einer Variotherm-Technologie zur Halbierung des Energieverbrauchs in der EPP-Formteilherstellung" [The Development of a Variothermal Technology for Halving the Energy Consumption in EPP Moulding Production] from April 2017. The content of this reference is fully encompassed by the present application, with EPP standing for expanded polypropylene.

The inventive use serves for production of structural foam and/or insulation foam, with structural foaming in one embodiment relating to sandwich structures. Structural foams or insulation foams according to the invention are preferably used in high-performance lightweight construction. PBT-based products composed of expanded PBT particle foam with typical densities in the range from 200 to 800 kg/m$^3$ that are obtainable in accordance with the invention are extremely light. Specifically for that reason, they are notable for good specific mechanical properties, thermal insulatability and enormous lightweight construction potential.

Preferred fields of use for structural foams and/or insulation foams are in aerospace, in defence technology, in wind power rotor blades, in automobile construction or in shipbuilding.

It will be understood that the specification and examples are illustrative but not limitative of the present invention and that other embodiments within the spirit and scope of the invention will suggest themselves to those skilled in the art.

EXAMPLES

Production of Polymer Foam Particles

The $CO_2$ loading of a PET-modified PBT pellet material according to the invention, additionally containing talc and Hostanox® P-EPQ, and having a grain diameter in the range from 0.5 to 2 mm and a length in the range from 0.5 to 3 mm, was conducted in an autoclave at a pressure of 10 to 70 bar over a period of 5 to 50 h. Subsequently, the $CO_2$-laden PBT pellets were guided through a continuous infrared oven (single-lane SL continuous infrared oven from Fox Velution GmbH) with a source power of 90% (here: about 20 kW) at a temperature measured at the oven exit in the range from 220 to 255° C. (merely reference band temperatures were measured optically—a wide variety of temperatures from 50° C. to 950° C. existed at different positions in the oven) at a speed of 500 to 800 mm/s. Finally, the particles were stabilized at room temperature for 24 hours.

The experiments in the context of the present invention additionally showed that, surprisingly, the use of PET in PBT reduced the growth rate of polymer foam cells that arise at the nucleation points. This results in polymer foam cells at more nucleation points. This in turn led to polymer foam particles having a more uniform cell structure of small cells.

The inventive use of PET in PBT additionally increases melt viscosity. Particularly at low shear rates in the range from 50 to 200 Pa·s, as occur in cell growth. With PET contents >25% on foaming in a continuous infrared oven, the melt viscosity of the PET-modified PBT, relative to standard PBT, rose from 109 to 112 Pa·s up to >200 Pa·s.

The rheological data in Tab. 1 show that the use of PET in PBT leads to a much higher melt viscosity in the low shear rate range, which is essential especially in the expansion of the cells and hence for cell growth.

The inventive use of PET in PBT, on the other hand, led to only a slight increase in the density of the pellets before foaming from 1.319 g/cm$^3$ to 1.346 g/cm$^3$, and is negligible with a difference of about 2%.

In-Mould Foaming

The polymer foam particles were moulded in an in-mould foaming process in a variothermally heatable mould with the temperature in the range of 225-255° C. to give cubes as illustrative moulding having dimensions of 25·25·10 mm. The heating rate of the mould was up to 8 K/s and the hold time at temperature was 5-15 min. After the moulding, the mould was cooled down to room temperature at a cooling rate of up to 8 K/s, and the moulding was parted from the mould and removed. The density of the cubes after 24 hours at room temperature was 392 kg/m$^3$.

Surprisingly, the inventive use of PET in PBT-based polymer foam particles, especially in combination with talc and very especially preferably additionally with Hostanox® P-EPQ, led to broadening of the process window in in-mould foaming from <4 K to <30 K when it was conducted in a steam-free manner in a variothermally heatable mould at a temperature in the range of 225-255° C.

Feedstocks

Polybutylene terephthalate (PBT): Pocan® B 1300 from Lanxess Deutschland GmbH;

Polyethylene terephthalate (PET): Lighter C88 from Equipolymers s.r.l., Amsterdam, the Netherlands;

Talc: Mistron® R10 from Imerys Talc Group, Toulouse, France

Hostanox® P-EPQ, manufacturer: BASF SE, Ludwigshafen

TABLE 1

| | Unit | Comp. 1 | Ex. 1 | Ex. 2 | Ex. 3 | Ex. 4 |
|---|---|---|---|---|---|---|
| PBT | [% by wt.] | 99.4 | 74.4 | 74.4 | 49.4 | 64.4 |
| PET | [% by wt.] | | 25 | 25 | 50 | 35 |
| TALC | [% by wt.] | 0.5 | 0.5 | 0.5 | 0.5 | 0.5 |
| HOSTANOX ® P-EPQ | [% by wt.] | 0.1 | 0.1 | 0.1 | 0.1 | 0.1 |
| Technology | | E/U* | E/U* | A/IR* | E/U* | A/IR* |
| Bulk density of polymer foam particles | [kg/m$^3$] | 173 | 276 | 218 | 160 | 95-294 |
| Moulded foam temperature | | 231 | 236 | 236 | 230 | 236 |
| Min. moulded foam temperature | [° C.] | 230 | 225 | 225 | 225 | 225 |
| Max. moulded foam temperature | [° C.] | 232 | 255 | 255 | 255 | 257 |
| Moulded foam process window | kelvin | <2 | <30 | <30 | <30 | <32 |
| Foam particle cell size | (mm) | 0.2 | 0.55 | 0.1 | 0.5 | 0.05 |
| Rheological tests | | | | | | |
| Moisture content by Karl Fischer (visco.) | [%] | 0.007 | 0.005 | 0.005 | 0.002 | n.a. |
| Melt viscosity 260°C ETA (50/s) | [Pas] | 111 | 149 | 149 | 244 | 285 |
| Melt viscosity 260°C ETA (100/s) | [Pas] | 112 | 135 | 135 | 219 | 250 |
| Melt viscosity 260°C ETA (200/s) | [Pas] | 109 | 138 | 138 | 215 | 248 |
| Melt viscosity 260°C ETA (500/s) | [Pas] | 113 | 136 | 136 | 188 | 214 |
| Melt viscosity 260°C ETA (1000/s) | [Pas] | 99 | 120 | 120 | 155 | 176 |
| Melt viscosity 260°C ETA (1500/s) | [Pas] | 92 | 114 | 114 | 134 | 152 |
| Melt viscosity 260°C ETA (5000/s) | [Pas] | 62 | 71 | 71 | 83 | 91 |

*E/U = extrusion with blowing agent and underwater pelletization
**A/IR = autoclave gas loading and foaming in continuous infrared oven

What is claimed is:

1. A polymer foam particle comprising at least one blowing agent selected from the group consisting of air, nitrogen and carbon dioxide, and 25 to 320 parts by mass of polyethylene terephthalate per 100 parts by mass of polybutylene terephthalate.

2. The polymer foam particle according to claim 1, wherein the particle has a density of 50 to 700 kg/m$^3$.

3. The polymer foam particle according to claim 1, wherein the particle has a density of 90 to 400 kg/m$^3$.

4. The polymer foam particle according to claim 1, wherein the particle further comprises 0.1 to 20 parts by mass per 100 parts by mass of polybutylene terephthalate of talc.

5. The polymer foam particle according to claim 1, wherein the particle further comprises 0.1 to 5 parts by mass per 100 parts by mass of polybutylene terephthalate of talc.

6. The polymer foam particle according to claim 4, wherein the particle further comprises 0.1 to 20 parts by mass per 100 parts by mass of polybutylene terephthalate of at least one further additive other than talc.

7. The polymer foam particle according to claim 4, wherein the particle further comprises 0.1 to 5 parts by mass per 100 parts by mass of polybutylene terephthalate of at least one further additive other than talc.

8. The polymer foam particle according to claim 6, wherein the at least one further additive is selected from the group consisting of UV stabilizers, thermal stabilizers, lubricants, demoulding agents, fillers, reinforcers, nucleating agents, laser absorbers, di-or polyfunctional branching or chain-extending additives, hydrolysis stabilizers, antistats, emulsifiers, plasticizers, processing auxiliaries, flow auxiliaries, elastomer modifiers and colourants.

9. The polymer foam particle according to claim 6, wherein the at least one further additive is tetrakis (2,4-di-tert-butylphenyl) 4,4'-biphenyldiphosphonite.

10. A process for producing polymer foam particles of claim 1, the method comprising the steps of:
    (a) introducing powders or pellets of a polymer matrix into an extruder with exclusion of crosslinking agents and/or chain-extending agents and plasticizing and homogenizing the powders or pellets,
    (b) adding and dispersing into the plasticized polymer matrix a blowing agent selected from the group consisting of air, nitrogen and carbon dioxide,
    (c) discharging the plasticized polymer matrix with the added blowing agent through an extruder die,
    (d) pelletizing downstream of the extruder die the extruded polymer matrix strand with the added blowing agent to form expandable or at least partly expanded polymer foam particles, and
    (e) expanding the polymer foam particles, wherein the polymer matrix contains 25 to 320 parts by mass of polyethylene terephthalate per 100 parts by mass of polybutylene terephthalate.

11. The process according to claim 10, wherein the process steps (c) and (d) are performed with or in a cooling fluid.

12. The process according to claim 10, wherein the process step (e) is effected in a continuous infrared oven.

13. The process according to claim 10, wherein the polymer foam particles have a density in the range from 50 to 700 kg/m3.

14. The process according to claim 10, wherein the polymer foam particles have a density in the range from 90 to 400 kg/m$^3$.

15. The process according to claim 13, wherein the polymer matrix further comprises 0.1 to 20 parts by mass per 100 parts by mass of polybutylene terephthalate of talc.

16. The process according to claim 13, wherein the polymer matrix further comprises 0.1 to 5 parts by mass per 100 parts by mass of polybutylene terephthalate of talc.

17. The process according to claim 15, wherein the polymer matrix further comprises 0.1 to 20 parts by mass per 100 parts by mass of polybutylene terephthalate of at least one additive other than talc.

18. The process according to claim 15, wherein the polymer matrix additionally contains 0.1 to 5 parts by mass per 100 parts by mass of polybutylene terephthalate of at least one additive other than talc.

19. The process according to claim 17, wherein the least one additive other than talc is selected from the group consisting of UV stabilizers, thermal stabilizers, lubricants, demoulding agents, fillers, reinforcers, nucleating agents, laser absorbers, di-or polyfunctional branching or chain-extending additives, hydrolysis stabilizers, antistats, emulsifiers, plasticizers, processing auxiliaries, flow auxiliaries, elastomer modifiers and colourants.

20. The process according to claim 17, wherein the at least one additive other than talc is tetrakis (2,4-di-tert-butylphenyl) 4,4'-biphenyldiphosphonite.

* * * * *